United States Patent
Kanno (10) Patent No.: US 10,083,797 B2
(45) Date of Patent: Sep. 25, 2018

(54) VARIABLE CAPACITANCE CIRCUIT, VARIABLE CAPACITANCE DEVICE, AND RESONANCE CIRCUIT AND COMMUNICATION APPARATUS USING THE SAME

(71) Applicant: DEXERIALS CORPORATION, Tokyo (JP)

(72) Inventor: Masayoshi Kanno, Tokyo (JP)

(73) Assignee: Dexerials Corporation, Tokyo (JP)

( * ) Notice: Subject to any disclaimer, the term of this patent is extended or adjusted under 35 U.S.C. 154(b) by 384 days.

(21) Appl. No.: 14/898,983

(22) PCT Filed: May 28, 2014

(86) PCT No.: PCT/JP2014/002817
§ 371 (c)(1),
(2) Date: Dec. 16, 2015

(87) PCT Pub. No.: WO2015/019527
PCT Pub. Date: Feb. 12, 2015

(65) Prior Publication Data
US 2016/0133387 A1    May 12, 2016

(30) Foreign Application Priority Data

Aug. 8, 2013    (JP) .................. 2013-164652

(51) Int. Cl.
*H01G 7/06* (2006.01)
*H04B 5/00* (2006.01)

(52) U.S. Cl.
CPC ............. *H01G 7/06* (2013.01); *H04B 5/0075* (2013.01)

(58) Field of Classification Search
CPC ....................................... H01G 7/06
(Continued)

(56) References Cited

U.S. PATENT DOCUMENTS 6,674,321 B1 * 1/2004 York .................. H01G 7/06
327/334
8,288,895 B2 * 10/2012 Yoon .................. H03J 3/20
307/109
(Continued)

FOREIGN PATENT DOCUMENTS

JP    2006066647    3/2006
JP    2008160312    7/2008
(Continued)

OTHER PUBLICATIONS

International Search Report issued in PCT/JP2014/002817 dated Jun. 24, 2014 (1 page).

Primary Examiner — Joseph Chang
(74) Attorney, Agent, or Firm — K&L Gates LLP (57) ABSTRACT

The present invention achieves a proper balance among multiple constituent bias resistors of a variable-capacitance circuit by using different resistance values for resistors located at specific positions and the other resistors, thereby reducing a response time while sufficiently blocking an alternating-current component. This variable-capacitance circuit is a variable-capacitance circuit for which variable-capacitance components (C1-C4), the capacitances of which change in accordance with a control voltage, are connected in series between terminals to which an alternating-current signal is applied, and multiple bias application paths for applying a bias voltage to each of the variable-capacitance components via resistance components (R1-R5) are formed, wherein, among resistance components (R1-R5), resistance components (R1, R5) connected to the terminals, to which the alternating current is applied, have different resistance values from the resistance values of the other resistance components (R2-R4).

6 Claims, 9 Drawing Sheets

(58) Field of Classification Search
USPC .......................................................... 307/109
See application file for complete search history.

(56) References Cited

U.S. PATENT DOCUMENTS

| | | | |
|---|---|---|---|
| 2013/0217327 A1 | 8/2013 | Kanno et al. | |
| 2013/0286534 A1 | 10/2013 | Ikehashi et al. | |
| 2014/0139968 A1 | 5/2014 | Ikenaga et al. | |
| 2015/0294795 A1* | 10/2015 | Ueki | H01G 4/40 |
| | | | 361/56 |

FOREIGN PATENT DOCUMENTS

| | | |
|---|---|---|
| JP | 2012099968 | 5/2012 |
| JP | 2013232536 | 11/2013 |
| JP | 2014103181 | 6/2014 |

\* cited by examiner

VARIABLE CAPACITANCE CIRCUIT, VARIABLE CAPACITANCE DEVICE, AND RESONANCE CIRCUIT AND COMMUNICATION APPARATUS USING THE SAME

CROSS REFERENCES TO RELATED APPLICATIONS

The present application is a national stage of International Application No. PCT/JP2014/002817 filed on May 28, 2014 and claims priority to Japanese Patent Application No. 2013-164652 filed on Aug. 8, 2013, the disclosure of which is incorporated herein by reference.

BACKGROUND

This invention relates to a variable capacitance circuit capable of varying electrostatic capacitance values in accordance with an application of a direct current voltage as a control voltage, a variable capacitance device, a resonance circuit using the same circuit, and a communication apparatus using the same circuit.

Various technologies have been developed in the art of near field communication (NFC) system, in which non-contact data transmission is performed between IC cards such as, e.g., railroad tickets (e.g., Suica (registered trademark)) as well as electronic moneys, e.g., FeliCa (registered trademark) and a reader-writer device.

In such a near field communication system, a receiver side has a resonance circuit made of an antenna coil and a capacitor, and does communication and transmits electric power upon resonating a signal outputted from a transmitter side. Good effective transmission can be done if the transmission frequency and the resonance frequency on the receiver side are the same to each other. In fact, there are some problems such as deviations of constants of resonance capacitors and deviations of resonance frequency on the power receiver side due to such as a correlative position to the power transmitter side.

For this problem, for example, Patent Document No. 1 (see, below) discloses a method adjusting the resonance frequency discretely by switching the resonance capacitors in the resonance circuit. That is, with Patent Document No. 1, disclosed is the method for adjusting resonance frequency in which plural capacitors forming the resonance circuit are connected in parallel and turned on and off by the switches respectively to change the capacitance. Adjusting accuracy, however, may be limited because the change of capacitance is stepwise.

To the contrary, for example, Patent Document No. 2 proposes a method for adjusting the resonance frequency in an analog manner in which the resonance capacitor is formed of variable capacitance elements whose control voltages are applied with fixed steps. That is, the variable capacitance elements can change the resonance frequency because the capacitance changes when applied with the direct current voltage (control voltage).

More specifically, the Patent Document No. 2 shows that the resonance frequency can be adjusted easily as no need for peak detection by utilizing phase differences of signals corresponding to input and output of the resonance antenna as monitoring signals for adjustment and discloses a method seeking the optimum value upon increasing the adjustment voltage in a stepwise manner. Because the method increasing the control voltage in the stepwise manner in fixing the step width takes more time for adjustment, a method shortening the adjusting time by changing the step width has been known. Generally, it is said that a half dividing method, in which the control voltage range is narrowed in making the range half sequentially at each step, has a less adjusting step number for searching the entire range of the control voltage than that of a sequential seeking method.

Figure 9:
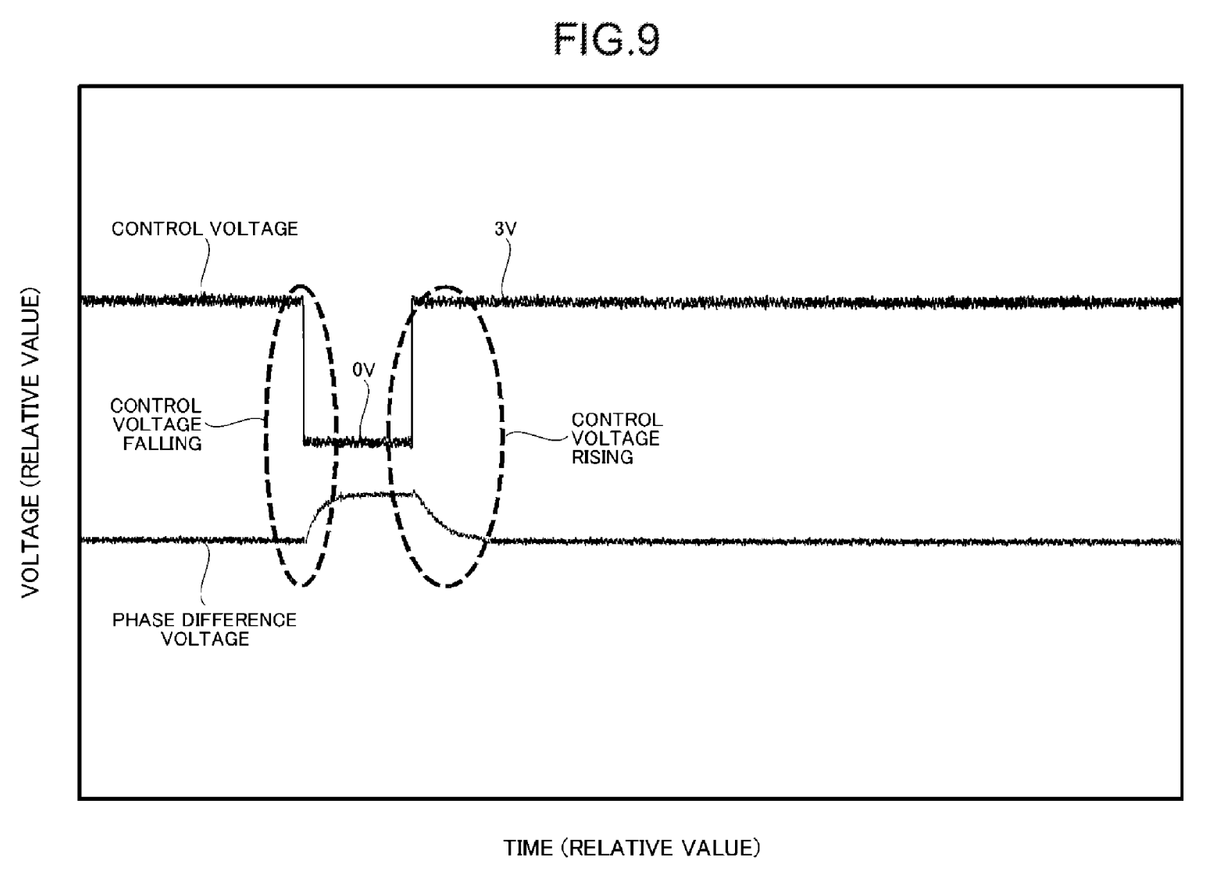
FIG. 9 is a diagram showing a response characteristic of variable capacitance circuit.

FIG. 9 shows response characteristics of the variable capacitance element, and it is described. In FIG. 9, the control voltage changing the capacitance of the variable capacitance element and the consequence that the phase difference from the capacitance change is converted into the voltage are compared. According to FIG. 9, it turns out that the phase difference voltage increases or decreases exponentially gradually even where the control voltage changes stepwisely. The response at which the control voltage is changed from 3V to 0V is faster than that at which the control changed from 0V to 3V. It is to be noted that the response time is 300 to 400 milliseconds in this example.

Patent Document No. 1: Japanese Patent Application Publication No. 2008-160312

Patent Document No. 2: Japanese Patent Application Publication No. 2012-099968

SUMMARY

Problems to be Solved by the Invention

High speed response is sought where the system is applied for near field communication. With the art using the resonance capacitor formed of the variable capacitance element, however, it takes time for turning if the variable capacitance element itself has a long time constant, so that the resonance circuit may not be optimized in real time during telecommunications.

In a case where the bias resistor constituting the variable capacitance element has a very high resistance value, the response time becomes longer, thereby raising a problem such that the system does not operate normally.

In consideration to solve the above problem, it is an object of the invention to provide a variable capacitance circuit making a resistor formed at a particular place, among plural bias resistors, have a different resistance value from that of another resistor to obtain a proper balance for making the response time short as cutting off alternative current component adequately, and to provide a variable capacitance device, a resonance circuit using the variable capacitance circuit, and a communication apparatus using the same.

Means to Solve the Problems

To solve the above technical problems, a variable capacitance circuit according to an embodiment of the invention is a variable capacitance circuit having a plurality of variable capacitance elements with capacitance variable according to a control voltage, connected in series between terminals to which an alternative current signal applies, and a plurality of bias application paths applying a bias voltage via a resistance element to each of the variable capacitance elements, wherein, among the plural resistance elements, the resistance element connected to the terminal to which the alternative current signal applies has a resistance value different from that of another resistance element.

A variable capacitance device, a resonance circuit, and a communication apparatus according to other embodiments of the invention have a feature having the variable capacitance circuit.

Advantages of the Invention

According to the variable capacitance circuit, the variable capacitance device, and the resonance circuit and the communication apparatus using the variable capacitance circuit, the response time can be shortened while cutting off the alternative current component alternatively, by making different the resistance values between the resistor of a particular place and another resistor to have a proper balance.

Additional features and advantages are described herein, and will be apparent from the following Detailed Description and the figures.

DETAILED DESCRIPTION

Hereinafter, referring to the drawings, a variable capacitance circuit, a variable capacitance device, and a resonance circuit and an electronic apparatus using the variable capacitance circuit, according to preferred embodiments of the invention, are described. It is to be noted that the variable capacitance circuit, the variable capacitance device, and the resonance circuit and the electronic apparatus using the variable capacitance circuit of the invention are not limited to the description below, and are modifiable properly as far as not deviated from the nub of the invention.

This invention provides the variable capacitance circuit, the variable capacitance device, and the resonance circuit and the electronic apparatus using the variable capacitance circuit, having a feature that a bias resistance value of a resistor connected to a terminal that an alternative current signal inputs and outputs is lower than a bias resistance value of a resistor connected to a terminal that a control signal inputs, in the variable capacitance circuit in which plural variable capacitance elements are connected in series. A detailed description is as follows.

First Embodiment

Figure 1:
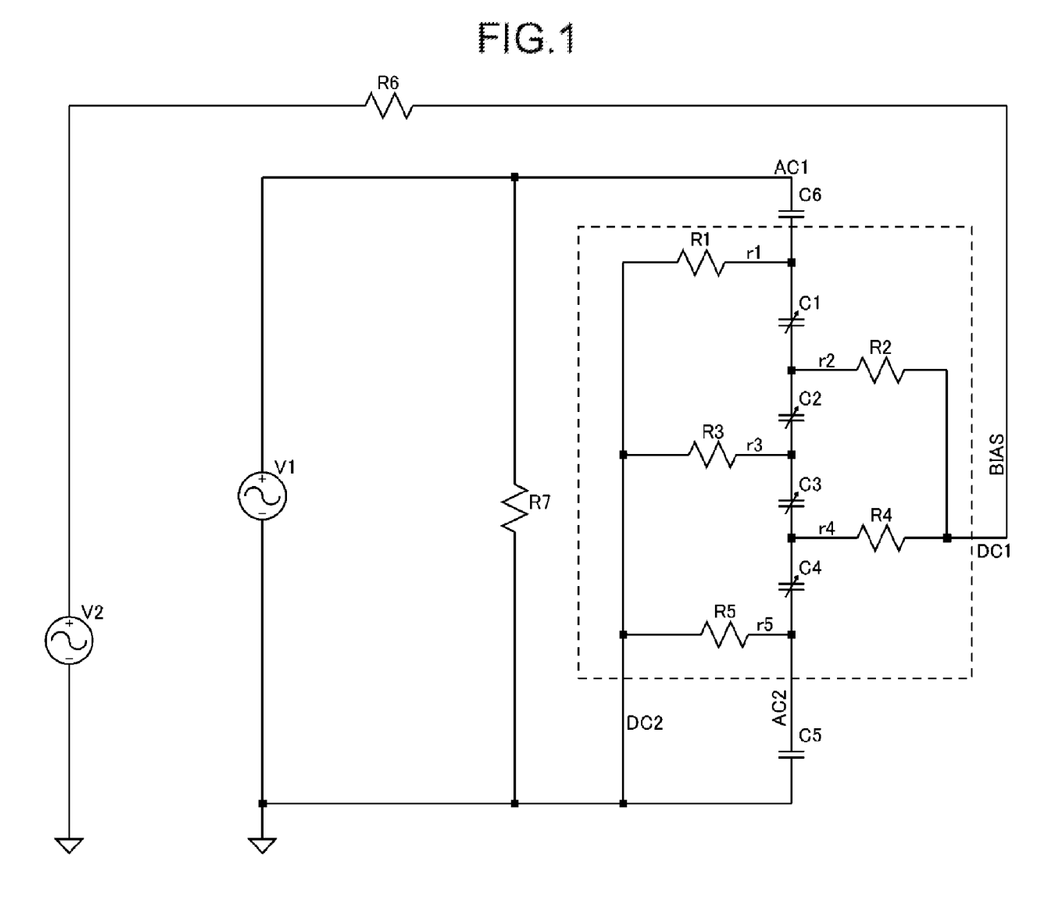
FIG. 1 is a circuit diagram showing a structure of a variable capacitance circuit according to a first embodiment of the invention.

FIG. 1 shows a structure of the variable capacitance circuit according to the first embodiment of the invention, and it is described.

A variable capacitance element using dielectric body has an electrostatic capacitance value changeable according to a control voltage applied between the terminals, and the variable capacitance elements C1 to C4 are connected in series between two alternative current input terminals AC1, AC2. In this example, the number of variable capacitance element connections in series is set to four, but the number can be a suitable number of connections in series based on a withstand voltage required for this circuit. Where the four elements are connected in series, the circuit can handle a signal with an amplitude four times larger of a withstand voltage of a single unit cell. The number of the connection in series can be single or plural. In this embodiment, the variable capacitance elements have the same electrostatic capacitance value, but this is not always required.

The variable capacitance element can be manufactured in accumulating plural layers in which, e.g., a ferroelectrics thin film such as barium titanate is formed with deposited metal electrodes. Variable capacitance diodes, so called varicap diodes, have been known as having an electrostatic capacitance changeable according to a voltage applying to the terminal, but the variable capacitance elements have an advantage that having a non-polarity property and a high withstand voltage in comparison with the varicap diodes. A portion surrounded with a broken line in FIG. 1 corresponds to the variable capacitance device.

This variable capacitance circuit can change the electrostatic capacitance value by applying direct current voltages (control voltages) individually to the variable capacitance elements C1 to C4 via bias resistors R1 to R5. The direct current voltage is applied between direct current input terminals DC1, DC2. In this embodiment, to raise the alternative current withstand voltage, the plural variable capacitance elements C1 to C4 are connected in series, and the respective variable capacitance elements C1 to C4 are separated with the bias resistors R1 to R5 for applying bias voltages individually.

More specifically, the direct current input terminals DC1, DC2 are connected to the opposite end electrodes of the variable capacitance element C1 via the resistor R2, R1, to the opposite end electrodes of the variable capacitance element C2 via the resistor R2, R3, to the opposite end electrodes of the variable capacitance element C3 via the resistor R4, R3, to the opposite end electrodes of the variable capacitance element C4 via the resistor R4 R5, respectively. With this connection, all of the opposite end electrodes of the variable capacitance elements C1 to C4 are supplied with the same direct current bias voltage.

Direct current blocking capacitance elements C5, C6 are connected in series between alternative current input terminals AC1, AC2 to prevent the control voltage applying to the variable capacitance device from leaking into the terminals AC1, AC2.

The bias resistors R1 to R5 are required to have adequately high resistances with respect to reactance $1/\omega C_{VAC}$ for the purpose of separation between the AC components serving as RF signals and the DC components serving as the bias signals. If the bias resistor has a low resistance value, the alternative current component flows into the direct current input terminals DC1, DC2 and the alternative current input terminals AC1, AC2 while the bias resistors serve as a bypath circuit, thereby increasing a loss, and making device's Q value (Quality Factor) lower. Where the variable capacitance circuit is used for a resonance circuit, a high Q value is required, and the bias resistor has to have a high resistance to form an element having a reduced loss applicable to the resonance circuit. With this configuration, however, there raises another problem that turning cannot be done with a high speed. The variable capacitance device according to this embodiment also solves this problem as described below. The Q value generally means a value indicating a peek of the resonance, and shows small losses of the dielectric body.

Figure 2:
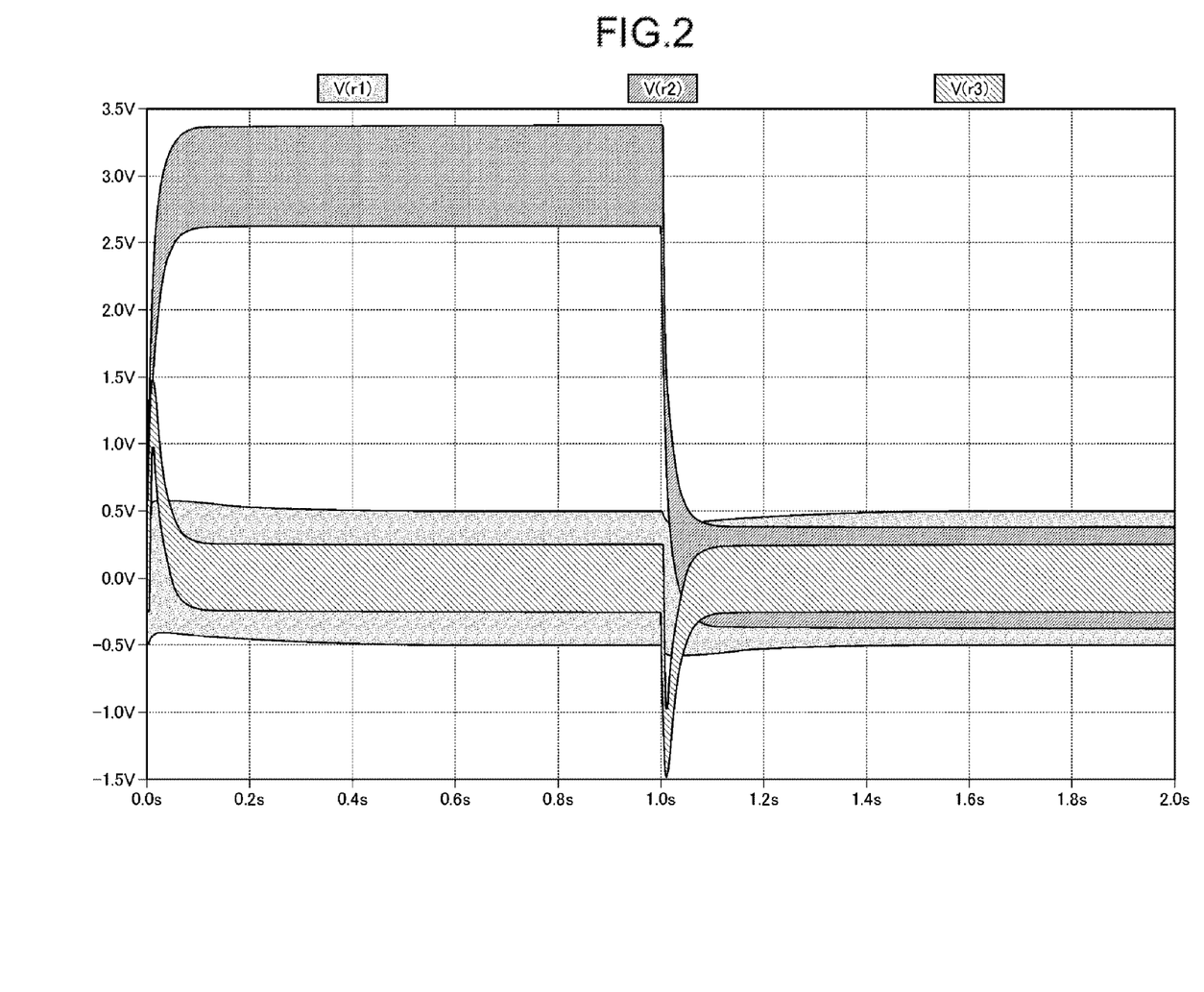
FIG. 2 is a diagram showing voltage change at connection points r1, r2, r3 between bias resistors R1 to R3 and variable capacitance elements C1, C2 of the variable capacitance circuit according to the first embodiment of the invention.
Figure 3:
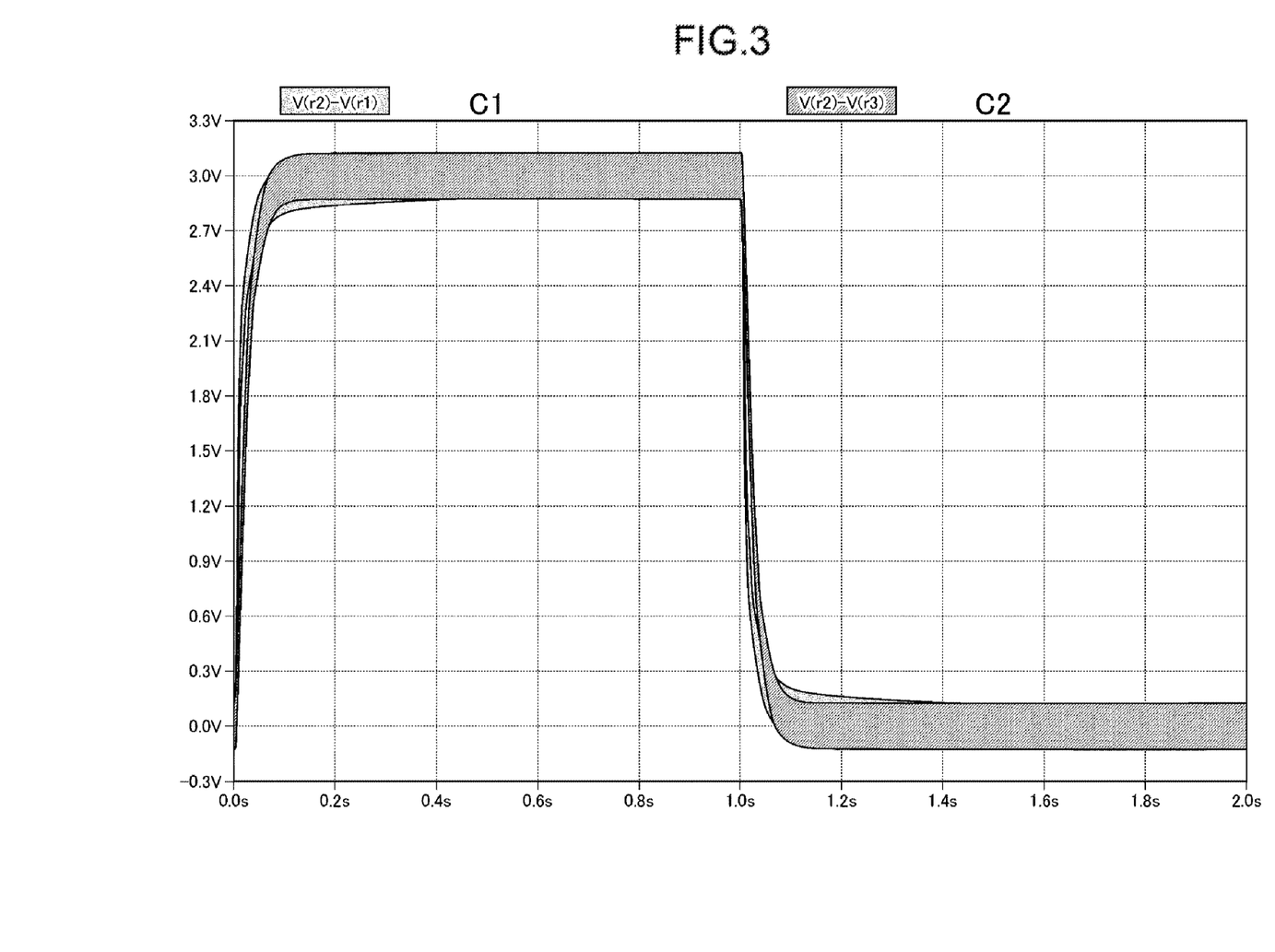
FIG. 3 is a diagram showing a calculation result of the potential difference between terminals of the variable capacitance elements C1, C2 of the variable capacitance circuit according to the first embodiment of the invention.

Next, FIGS. 2, 3 show an example of calculation results of responses with the variable capacitance circuit in FIG. 1 shown above when the control voltage is changed at 0 to 3V and 3 to 0V, and it is described. That is, voltage changes of the connection points r1, r2, r3 between the bias resistors R1, R2, and R3 and the variable capacitance elements C1, C2 are shown in FIG. 2; calculated potential differences between the terminals of the capacitance elements C1, C2 are shown in FIG. 3.

Although the variable capacitance elements C1 to C4 are provided in the variable capacitance circuit in FIG. 1, FIG. 3 shows only the potential differences between the terminals of the variable capacitance elements C1, C2, because the responses of the variable capacitance elements C1, C4 and the variable capacitance elements C2, C3 are the same to one another. A time when the direct current component of the potential between the terminals reaches 99.3% of the bias signal 3 Volts is shown as a response time; the response time of the variable capacitance element C1 located on an outer side of the elements is set to t1 whereas the response time of the variable capacitance element C2 located on an inner side of the elements is set to t2.

First, from FIG. 2, it is turned out that terminal voltages V(r1), V(r2), and V(r3) at the terminals r1, r2, and r3 of the variable capacitance elements C1, C2 connected in series, indicate different values because of overlapping of the alternative current signals and the direct current signals.

From FIG. 3, it is turned out that the voltages V(r2), −V(r1), V(r2)-V(r3) between the terminals of the variable capacitance elements C1, C2 show substantially the similar tendency. That is, in comparison between the variable capacitance element C1 on the outer side of the variable capacitance device and the variable capacitance element C2 on the inner side, the variable capacitance element C1 rises faster, but a time to become settled at the voltage 3V for the variable capacitance element C1 is longer than a time for the variable capacitance element C2.

According to a calculation example, where resistance values of the bias resistors R1 to R5 are all 15 MΩ, where electrostatic capacitance values of the variable capacitance elements C1 to C4 are 400 pF, and where electrostatic capacitance values of direct current blocking capacitors, or coupling capacitors, C5, C6 are 10 nF, the response time t1 of the variable capacitance element C1 is 205 ms, and the response time t2 of the variable capacitance element C2 is 108 ms, resulting that the time t1 is approximately twice of the time t2.

This is apparently a slow response in comparison with a time 60 ms, which is five times of a time constant τ=0.012 (99.3% voltage) calculated from a situation having the electrostatic capacitance value 400 pF of capacitors and the resistance value 30 MΩ (two of R1 and R2) of resistors in a general CR circuit.

The potential difference between terminals is the difference between the voltages between two terminals, and where the circuit structure is made of variable capacitance elements C1 to C4 connected in series, it is thought that the response of the voltage between the terminals takes a longer time because of response differences of the elements' terminals. It is turned out that influence to the response where the bias resistors R1 to R5 have high resistances for giving a priority to the resonance characteristic is larger in the variable capacitance circuit than in a general CR circuit, and that a general CR time constant is hard to make an argument.

According to above thinking, a method for improving a response without losing any resonance characteristics of the entire variable capacitance, or namely without making lower the resistance values of the bias resistors R1 to R5, is considered. From calculations, it is turned out that improving the response of the variable capacitance element C1(C4) located on the outer side of the device is important, and therefore, the response time of the variable capacitance element C1(C4) is calculated upon changing the resistance values of the bias resistors R1(R5), R2(R4) and the electrostatic capacitance values of the direct current blocking capacitor C5,(C6).

Figure 4:
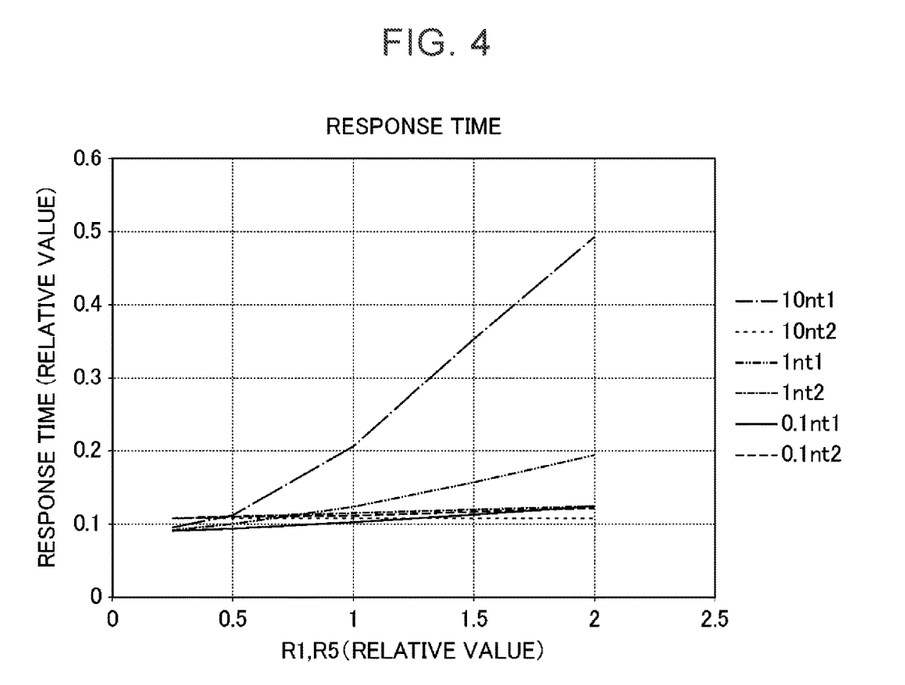
FIG. 4 is a diagram showing changes of response times t1, t2 of the variable capacitance elements C1, C2 when resistance values of the bias resistors R1, R5 located outside the variable capacitance device of the variable capacitance circuit according to the first embodiment of the invention.
Figure 5:
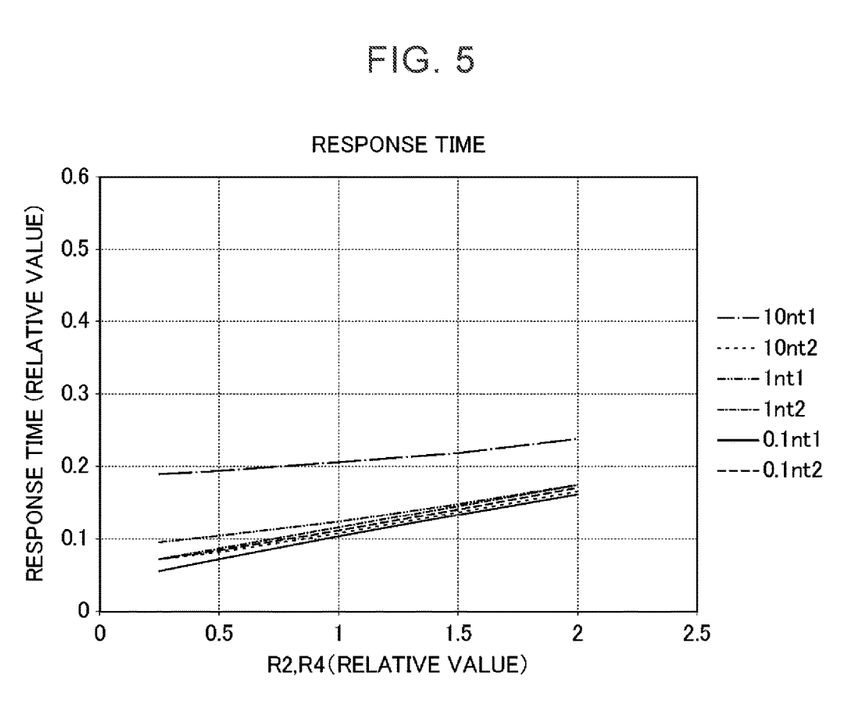
FIG. 5 is a diagram showing changes of response times t1, t2 of the variable capacitance elements C1, C2 when resistance values of the bias resistors R2, R4 located inside the variable capacitance device of the variable capacitance circuit according to the first embodiment of the invention.

The consequence is as shown in FIGS. 4, 5. That is, an examination as to whether there is any difference of the response times among the variable capacitance elements is conducted herein.

FIG. 4 shows changes of the response times t1, t2 of the variable capacitance elements C1, C2 where the resistance values of the bias resistors R1, R5 located on the outer side of the variable capacitance device are changed; FIG. 5 shows changes of the response times t1, t2 of the variable capacitance elements C1, C2 where the resistance values of the bias resistors R2, R4 located on the inner side of the variable capacitance device are changed.

According to the drawings, it is turned out that, in respect with the response times of the variable capacitance device, there is a large difference between the response time t1 of the variable capacitance element C1 and the response time t2 of the variable capacitance element C2. It is particularly turned out that the response time t1 is strongly influenced by the electrostatic capacitance of the direct current blocking capacitor C6.

The roles of the direct current blocking capacitors C5, C6 are not to leak the control voltage applied to the variable capacitance elements to the vicinity circuit; because the change width of the variable capacitances comes to be limited where the electrostatic capacitance value is small, the direct current blocking capacitors C5, C6 have values adequately larger than the capacitances of the variable capacitance elements C1 to C4, e.g., values equal to or more than one hundred (100) times.

From a viewpoint to the response characteristic, however, there raises a problem, and particularly, an influence appears apparently where the bias resistors R1, R5 have high resistance values. The capacitances of the direct current blocking capacitors C5, C6 are desirably chosen from a viewpoint to device designing, and it is important that the device is less affected from the electrostatic capacitances of the direct current blocking capacitors.

According to results in FIG. 4, where the resistance values of the bias resistors R1, R5 are set to relative values of 0.5 or less in comparison with the resistance values of other internal resistors, the influences from the direct current blocking capacitors C5, C6 can be made very small, and it is turned out that the response time is improved to be approximately a half in comparison with a case that all resistors have the same resistances.

In this situation, the current flowing from the alternative current input terminal AC1 to the direct current terminal DC2 (GND in this embodiment) and the current flowing between the alternative current input terminals AC1, AC2 may increase twice, but reduction due to the circuit loss may be suppressed to be the minimum when compared, because, in a view to the response characteristics, an equivalent advantage as each of the bias resistors R1 to R5 has a half of the resistance value, is obtained.

That is, it is turned that, not where the bias resistors R1 to R5 are set to have the same resistance value but where the resistors R1, R5 connected on the sides of the alternative input terminal AC1, AC2 are designed to have relatively lower resistance values in comparison with other bias resistors, the response time of the variable capacitance elements can be shortened, thereby suppressing reduction due to the loss to be the minimum, and the influence from the direct current blocking capacitors C5, C6 can be made very small.

As a matter of course, the response can be improved where resistors having lower resistance values than those of the built-in bias resistors R1 to R5 are separately added to the alternative input terminals AC1, AC2 as external additions, even where the same device is used.

As described above, according to the first embodiment of the invention, the variable capacitance circuit is provided with setting that the bias resistors R1, R5 connected to the alternative current input terminals AC1, AC2 to which the alternative current signal applies are set to have values different from those of the bias resistors R2, R4 connected to the direct current terminals in the variable capacitance circuit having the plural variable capacitance elements C1 to C4 connected in series.

The bias resistors R1, R5 connected to the alternative current input terminals to which the alternative current single applies may be set to values lower than those of the bias resistors R2, R3 connected to the direct current terminals, and preferably to values of 0.5 or less.

Accordingly, with the variable capacitance circuit according to the first embodiment of the invention, the response time can be shortened as adequately cutting off the alternative current component, where the variable capacitance circuit has a proper balance in changing resistance values between the resistors located at the particular places and the other resistors among the plural bias resistors.

Second Embodiment

Figure 6:
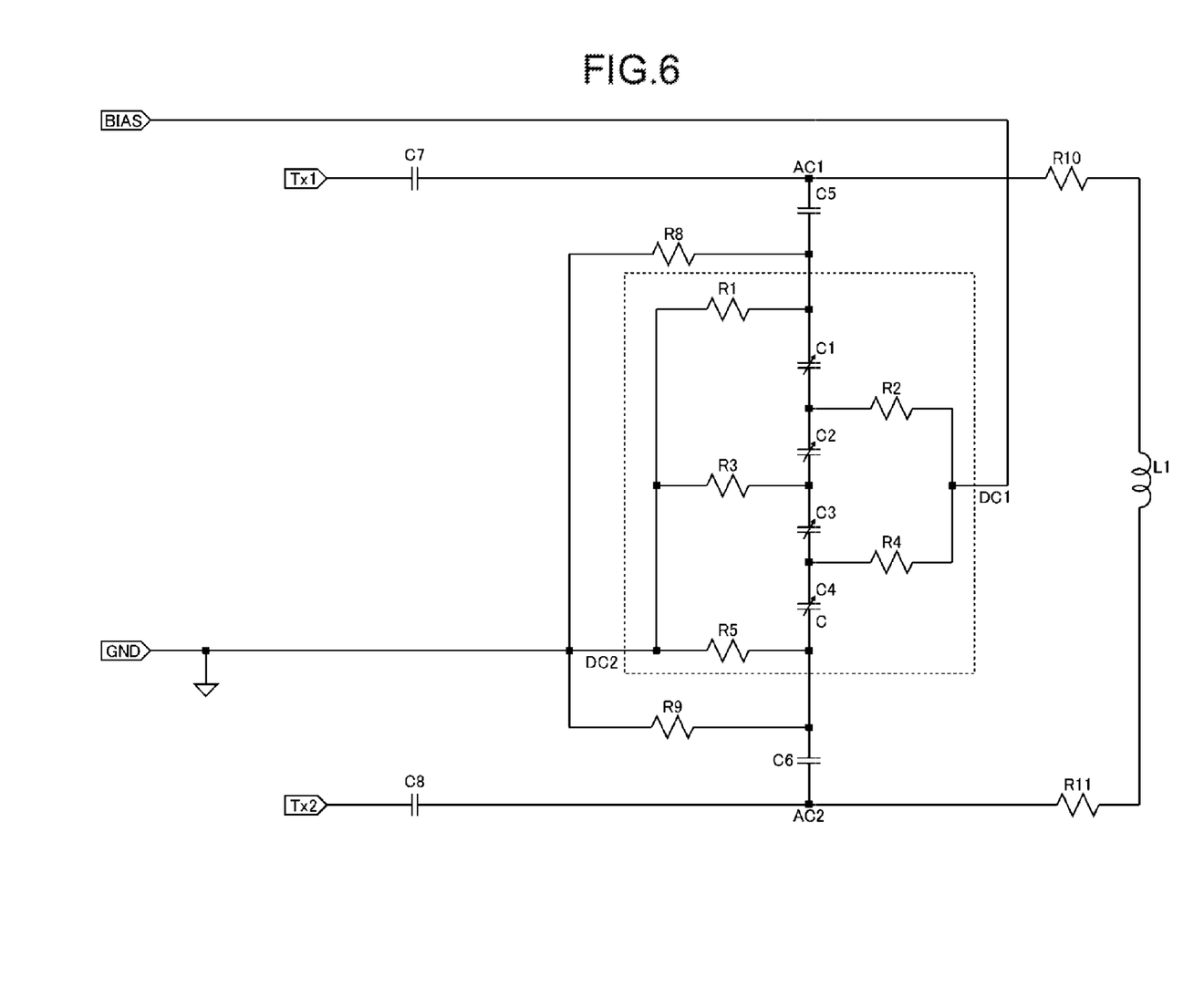
FIG. 6 is a circuit diagram showing a structure of a resonance circuit using a variable capacitance circuit according to a second embodiment of the invention.

FIG. 6 shows a resonance circuit using a variable capacitance circuit according to a second embodiment of the invention, and it is described. That is, this illustrates the variable capacitance circuit adapted for the resonance circuit of R/W (reader-writer device) for NFC (near field communication).

As shown in FIG. 6, the variable capacitance elements C1 to C4 are connected in series to input terminals AC1, AC2 of a differential transmission signal. The variable capacitance elements are manufactured in accumulating in plural number a ferroelectric thin film such as, e.g., barium titanate formed with deposited metallic electrodes. The electrostatic capacitance values can be changed in application of control voltages, respectively to the variable capacitance elements C1 to C4 via the bias resistors R1 to R5. The control voltage (BIAS) is applied between the direct current input terminals DC1, DC2. In this embodiment, to increase the withstand voltage, the four variable capacitance elements C1 to C4 are connected in series, and the variable capacitance elements C1 to C4 are separated by the bias resistors R1 to R5, thereby applying the bias voltages individually.

The direct current blocking capacitors C5, C6 are connected in series to the input terminals AC1, AC2 so as not to leak the control voltage (BIAS) applied to the variable capacitance elements to an antenna coil L1. In this embodiment, the direct current blocking capacitors C5, C6 are set to 10 nF, the variable capacitance circuit is not limited to this value. The resonance circuit is structured of the variable capacitance circuit and the antenna coil L1 described above. Resistors R10, R11 connected to the respective ends of the antenna coil L1 are damping resistors for adjusting the Q value (Quality Factor) of the resonance circuit.

With this structure, the differential transmission signals Tx1,Tx2 outputted from an LSI for telecommunication control with 13.56 MHz are connected to a parallel resonance circuit constituted of the antenna coil L1 and the capacitors C5, C1 to C4, C6. The resonance frequency can be made higher by rendering smaller a synthesized capacitance of the variable capacitance elements C1 to C4 upon raising the control voltage (BIAS).

In this embodiment, not where all of the resistance values of the incorporated bias resistors R1 to R5 are set to the same values, but where the resistance values of the resistors R1, R5 connected to the sides of the input terminals AC1, AC2 are designed to be relatively lower in comparison with the other bias resistors, thereby shortening the response time of the variable capacitance elements, suppressing reduction due to the loss to be the minimum, and making very small the influence of the direct current blocking capacitors C5, C6 connected externally. When the resistance values are set in such a manner, the externally added resistors R8, R9 may not be required, but in this embodiment, by adding the external resistors R8, R9, the influence of the vicinity circuit constant can be reduced even where the same variable capacitance device is used, so that the response time can be shortened.

As described above, according to the second embodiment of the invention, the variable capacitance circuit is provided in featuring that, among the resistors R1 to R5, the resistance values of the resisting elements R1, R5 connected to the terminals to which the differential transmission signal applies are different from the resistance values of other resistance elements R2, R4, where comprising the variable capacitance circuit having the variable capacitance elements C1 to C4 connected in series between the terminals to which the differential signal outputted from such as, e.g., LSI for telecommunication control, applies, whose capacitances change according to the control voltages, and the plural bias application paths applying the bias voltages via the resistors R1 to R5 to the variable capacitance elements, respectively, and the resonance circuit made of the antenna coil L1.

The resistance values of the resistance elements R1, R5 connected to the terminals to which the differential transmission signal applies may be set to be lower than, and preferably one half or less than the resistance values of the other resistance elements R2, R4. The resistors R8, R9 having resistance values lower than the above resistance elements may be provided between the terminals to which the differential transmission signal applies.

Accordingly, in accordance with the second embodiment of the invention, high speed processing can be done by shortening the response time.

Third Embodiment

Figure 7:
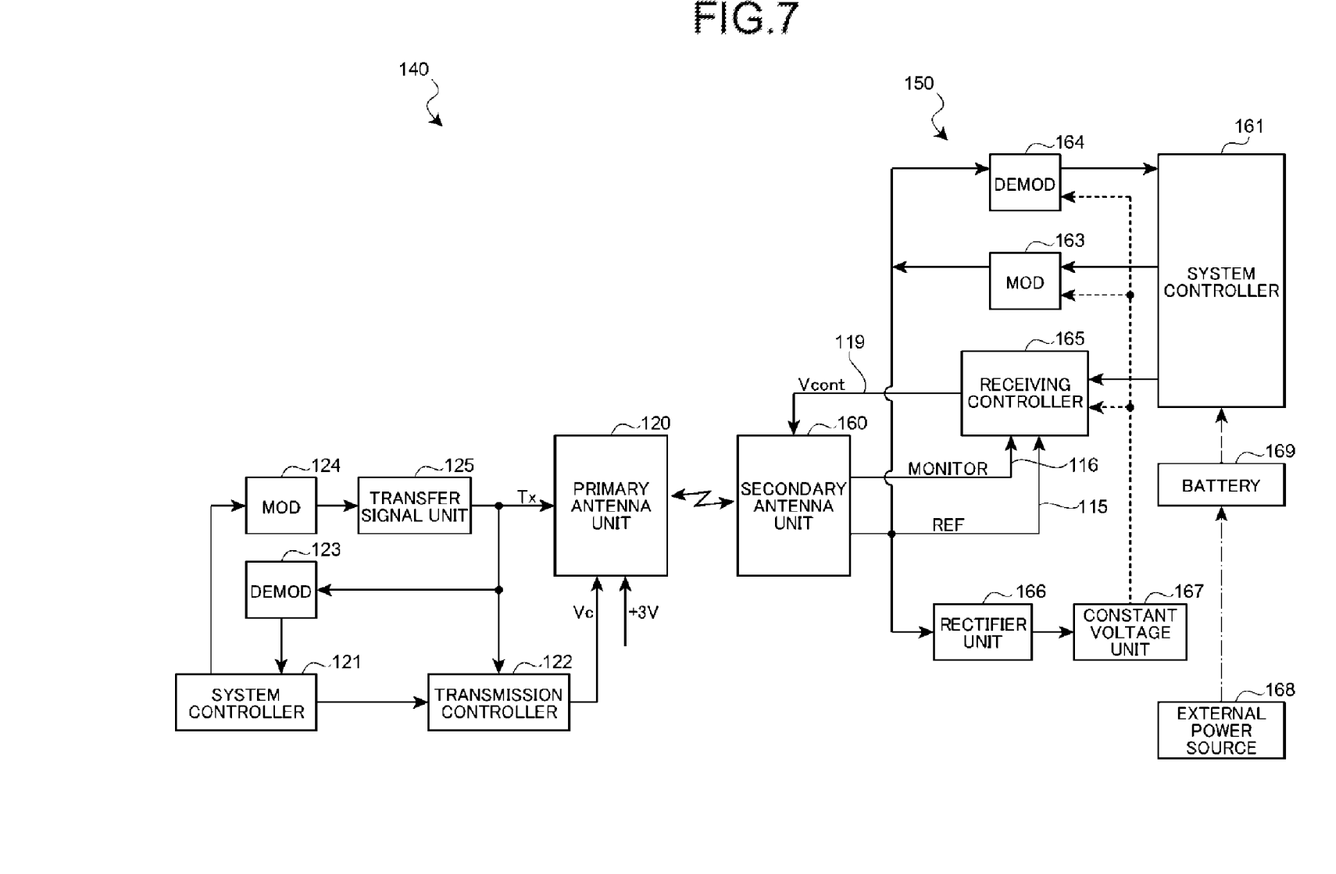
FIG. 7 is a block diagram showing a structural example of a non-contact communication apparatus using the variable capacitance circuit according to a third embodiment of the invention.

Next, FIG. 7 shows the structure of a communication apparatus according to the third embodiment of the invention, and it is described.

The resonance circuit as described above in the second embodiment is mounted on a non-contact communication apparatus, and this does communications with another non-contact communication apparatus in a non-contacting way. The non-contact communication apparatus is, e.g., a non-contact communication module 150 such as NFC mounted on a mobile phone, and another non-contact communication apparatus is a reader-writer 140 in such as, e.g., a non-contact communication system.

The non-contact communication module 150 includes a secondary antenna unit 160 including resonance capacitors having the variable capacitance elements described above in the second embodiment and a resonance coil. The non-contact communication module 150 has a rectifier unit 166 rectifying an alternative current signal transmitted from the reader-writer 140 and converting the signal to a direct current electric power to be used for power sources of each blocks, and a constant voltage unit 167 generating voltages corresponding to each block. The non-contact communication module 150 includes a demodulation unit 164, a modulation unit 163, and a receiving controller 165, activated by the direct current voltage supplied from the constant voltage unit 167, and also includes a system controller 161 for controlling entire operation.

The signal received at the secondary antenna unit 160 is subject to direct current electric power conversion done by the rectifier unit 166, and is demodulated at the demodulation unit, and the transmission data from the reader-writer 140 are analyzed with the system controller 161. The system controller 161 generates transmission data of the non-contact communication module 150, and the transmission data are modulated into a signal transmitted to the reader-writer 140 at the modulation unit 163 and are transmitted via the secondary antenna unit 160. The receiving controller 165 adjust the resonance frequency of the secondary antenna unit 160 according to the control steps of the system controller 161.

The receiving controller 165 receives an input signal (REF) 115 of the secondary antenna unit 160 and an output signal (MONITOR) 116 of the secondary antenna unit 160, and compares phases of those signals. The receiving controller 165, as a result of the phase comparison of the input and output signals, controls a control voltage (Vcont) 119 so that the resonance frequency of the secondary antenna unit 160 comes to be a target value, or namely the resonance frequency that a primary antenna unit 120 transmits.

To the contrary, the reader-writer 140 of the non-contact communication system is formed with the primary antenna unit 120 including a resonance circuit having a variable capacitance circuit with the resonance capacitors and having a resonance coil. The reader-writer 140 includes the system controller 121 controlling operation of the reader-writer 140, a modulation unit 124 modulating the transmission signal based on the command from the system controller 121, and a transmission signal unit 125 transmitting, to the primary antenna unit 120, a carrier signal modulated according to the transmission signal from the modulation unit 124. The reader-writer 140 also includes a demodulation unit 123 for demodulating the modulated carrier signal transmitted from the transmission signal unit 125.

It is as a matter of course that the reader-writer 140 can be mounted with an automatic adjustment function of the resonance frequency in substantially the same way as the non-contact communication module 150.

With this structure, the reader-writer 140 adjusts the impedance for matching with the primary antenna unit 120 based on the carrier signal sent from the transmission signal unit 125. In the modulation unit 124, the modulation methods and the coding methods used in general reader-writers are such as Manchester coding method and ASK (Amplitude Shift Keying) modulation method. The carrier frequency is set to typically 13.56 MHz.

The transmitted carrier signal is subject to impedance adjustment by controlling the variable voltage Vc for the primary antenna unit 120 for obtaining the impedance matching upon monitoring the transmission voltage and transmission current at the transmission controller 122.

The signal transmitted from the reader-writer 140 is received at the secondary antenna unit 160 of the non-contact communication module 150, and its signal is demodulated at the demodulation unit 164. The contents of the demodulated signal are judged by the system controller 161, and the system controller 161 generates a response signal based on the consequence. The receiving controller 165 adjusts such as resonance parameters of the secondary antenna unit 160 based on the voltage phase and current phase of the received signal, thereby adjusting the resonance frequency as to make the receiving state optimum.

The non-contact communication module 150 modulates the response signal at the modulation unit 163, and transmits the signal to the reader-writer 140 with the secondary antenna unit 160. The reader-writer 140 demodulates, at the demodulation unit 123, the response signal received at the primary antenna unit 120, and the system controller 121 executes necessary processings based on the demodulated contents.

Fourth Embodiment

Figure 8:
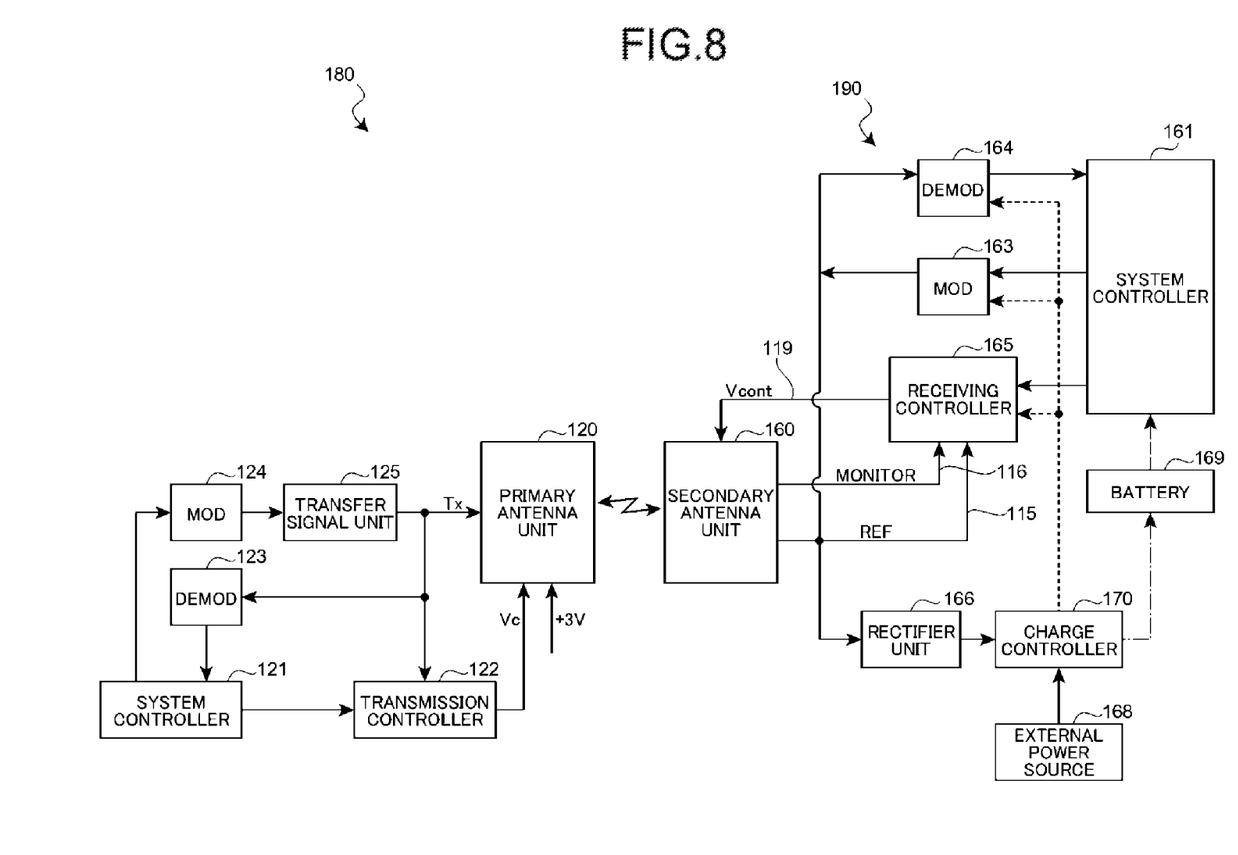
FIG. 8 is a block diagram showing a structural example of a non-contact charge apparatus using the variable capacitance circuit according to a fourth embodiment of the invention.

Next, FIG. 8 shows a structure of a telecommunication apparatus according to the fourth embodiment of the invention, and it is described.

The resonance circuit as described in the second embodiment can be mounted on a power receiving apparatus 190 for charging a secondary battery built in a mobile terminal such as movers in a non-contact way. As the method for non-contact charge, it is not limited to any particular method, and methods such as an electromagnetic method and magnetic resonance method are applicable. A structure of a non-contact charge system is exemplified herein which includes the power receiving apparatus 190 such as, e.g., a mobile terminal in application of the resonance circuit described above in the second embodiment, and a non-contact charge apparatus 180 charging the power receiving apparatus 190 in the non-contact way.

The power receiving apparatus 190 has the same structure as that of the non-contact communication module 150 described above. The structure of the non-contact charge apparatus 180 is substantially the same as that of the reader-writer 140 described above. Accordingly, those having the same functions as the blocks illustrated as the reader-writer 140 and the non-contact communication module 150 in FIG. 7 are assigned with the same reference numbers. For the reader-writer 140, the transmitted and received carrier frequency is 13.56 MHz in many situations, but for the non-contact communication module 150, the frequency can be 100 kHz to several hundreds kHz.

The non-contact charge apparatus 180 adjusts the impedance matching with primary antenna unit 120 based on the carrier signal sent out of the transmission signal unit 125.

Regarding the transmitted carrier signal, the transmission controller 122 monitors the transmission voltage and the transmission current, and the variable voltage Vc of the primary antenna unit 120 is controlled so as to gain the impedance matching, thereby adjusting the impedance.

The power receiving apparatus 190 rectifies at the rectifier unit 166 the signal received at the secondary antenna unit 160, and the battery 169 is charged with the rectified direct current voltage according to control of a charge controller 170. Even where the secondary antenna unit 160 receives no signal, the battery 169 can be charged by driving the charge controller 170 with an external power source 168 such as, e.g., an alternative current adaptor.

The signal transmitted from the non-contact charge apparatus 180 is received at the secondary antenna unit 160, and the signal is demodulated at the demodulation unit 164. The contents of the demodulated signal are judged with the system controller 161, and the system controller 161 generates the response signal based on the consequence. It is to be noted that the receiving controller 165 adjusts the control voltage Vcont 119 based on the voltage phase (input signal (REF) 115) of the receiving signal and the current phase (output signal (MONITOR) 116) to adjust the electrostatic capacitance value of the variable capacitance element of the secondary antenna unit 160, thereby adjusting the resonance frequency so as to make optimum the receiving status.

The first to fourth embodiments of the invention are thus described, but this invention is not limited to those, and a variety of improvements and modifications can be made, as a matter of course, so far as in a range not deviated from the spirits of the invention. For example, the number of the connection in series of the variable capacitance elements is not limited to four, but can be a number suitable for demands from withstand voltages.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

DESCRIPTION OF REFERENCE NUMBERS

C1 to C4 variable capacitance elements
C5, C6 direct current blocking capacitors
R1 to R5 bias resistors
R6, R7 resistors
V1 alternative current power source
V2 direct current power source
C7, C8 resonance capacitors connected in series
R8, R9 externally added resistors
R10, R11 damping resistors
L1 resonance coil

What is claimed is:

1. A variable capacitance circuit comprising:
a plurality of variable capacitance elements connected in series between a first terminal and a second terminal to which an alternative current signal applies, wherein each of the variable capacitance elements having a capacitance variable according to a control voltage;
a plurality of bias application paths applying a bias voltage via a plurality of resistance elements to the variable capacitance elements, and
at least two capacitors connected in series with the variable capacitance elements, wherein the at least two capacitors are connected directly to the first terminal and the second terminal respectively and are provided at an outer side of resistance elements connected directly to the first terminal and the second terminal,
wherein the resistance elements connected directly to the first terminal and the second terminal have resistance values lower than other resistance elements.

2. The variable capacitance circuit according to claim 1, wherein each of the resistance elements connected directly to the first terminal and the second terminal has a resistance value equal to or lower than half of resistance values of the other resistance elements.

3. The variable capacitance circuit according to claim 1, wherein the other resistance elements are provided between the first and second terminals and a third terminal to which the bias voltage of the bias application paths applies.

4. A variable capacitance device having the variable capacitance circuit according to any one of claim 1 and claim 2.

5. A resonance circuit having the variable capacitance circuit according to any one of claim 1, claim 2, and claim 3.

6. A communication apparatus having the variable capacitance circuit according to any one of claim 1, claim 2, and claim 3.

* * * * *